T. E. MURRAY & LE ROY H. HOFFER.
METHOD OF ELECTRIC SPOT WELDING.
APPLICATION FILED JUNE 28, 1916.
1,206,890.
Patented Dec. 5, 1916.
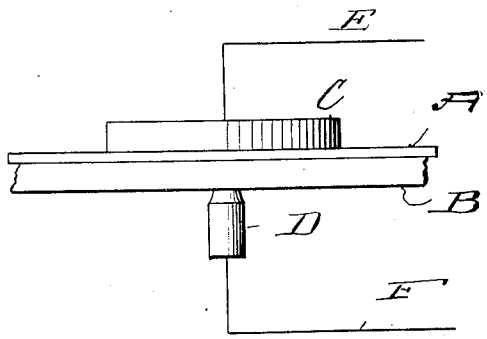
Inventors
Thomas E. Murray
Le Roy H. Hoffer
By Their Attorney

UNITED STATES PATENT OFFICE.

THOMAS E. MURRAY AND LE ROY H. HOFFER, OF NEW YORK, N. Y.; SAID HOFFER ASSIGNOR TO SAID MURRAY.

METHOD OF ELECTRIC SPOT-WELDING.

1,206,890. Specification of Letters Patent. Patented Dec. 5, 1916.

Application filed June 28, 1916. Serial No. 106,321.

*To all whom it may concern:*

Be it known that we, THOMAS E. MURRAY and LE ROY H. HOFFER, citizens of the United States, residing at New York, in the county of New York and State of New York, have invented a certain new and useful Improvement in Methods of Electric Spot-Welding, of which the following is a specification.

It is commonly found in electric spot-welding, that when attempts are made to unite a thin plate of metal to a relatively thicker plate, the thinner plate becomes burned before the thicker plate becomes sufficiently heated to weld. In endeavors to overcome this difficulty, a projection is sometimes made on the thicker plate, which projection is held in contact with the thin plate, so that said projection becomes individually melted on the passage of the current. The making of this projection adds to the expense of the welding operation.

We have discovered that the problem can be solved without the formation of the above noted projection and without any change in the plates to be welded, by suitably proportioning the electrodes, between which the plates are disposed. Our invention is, therefore, a process of electrically welding plates of different thicknesses, substantially as hereinafter set forth.

The accompanying drawing illustrates our said process.

A is a thin plate of rolled or sheet metal, which is to be electrically welded to the relatively thicker plate B.

C and D are the electrodes communicating by the conductors E, F, with any suitable source of welding current.

The electrode C is placed in contact with the relatively thin plate A. The electrode D is placed in contact with the relatively thick plate B. The superficial area of the contact surface of electrode C is many times larger than the superficial area of the contact surface of electrode D, and the mass of electrode C may be greater than that of electrode D. When the current is established between the electrodes, the electrode D restricts the heating effect of said current to a comparatively small area or spot on plate B, thereby increasing the temperature, and raising the metal rapidly to a welding state. The large electrode C, on the other hand, being in contact with the thin plate A conducts the heat away from said plate, so that it will not burn before the thicker plate B is raised to welding temperature, while it also reduces the amount of heat produced in the thinner plate by distributing the current in said thinner plate over a wide area therein. The small size of electrode D also reduces the amount of heat which is conducted away from the thicker plate B.

We claim:

1. The method of electrically spot welding two plates, one of which is relatively thinner than the other, which consists in subjecting said plates disposed in face contact to the action of a welding current while held between electrodes of different contact areas, the electrode of relatively greater contact area being disposed in contact with the thinner plate.

2. The method of electrically spot welding two plates, one of which is relatively thinner than the other, which consists in subjecting said plates disposed in face contact to the action of a welding current while held between electrodes of different masses and contact areas, the electrode of relatively greater mass and contact area being disposed in contact with the thinner plate.

In testimony whereof we have affixed our signatures in presence of two witnesses.

THOMAS E. MURRAY.
LE ROY H. HOFFER.

Witnesses:
GERTRUDE T. PORTER,
MAY T. McGARRY.